US012812157B2

(12) United States Patent
Nishimura et al.

(10) Patent No.: US 12,812,157 B2
(45) Date of Patent: Nov. 24, 2026

(54) MESH DECODING DEVICE, MESH DECODING METHOD, AND PROGRAM

(71) Applicant: KDDI CORPORATION, Shinjuku-ku (JP)

(72) Inventors: Hitoshi Nishimura, Fujimino (JP); Kei Kawamura, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 19/349,078

(22) Filed: Oct. 3, 2025

(65) Prior Publication Data

US 2026/0032277 A1 Jan. 29, 2026

Related U.S. Application Data

(63) Continuation of application No. PCT/JP2024/007918, filed on Mar. 3, 2024.

(30) Foreign Application Priority Data

Apr. 14, 2023 (JP) ................................ 2023-066595

(51) Int. Cl.
*H04N 19/124* (2014.01)
*H04N 19/18* (2014.01)
(Continued)

(52) U.S. Cl.
CPC ......... *H04N 19/503* (2014.11); *H04N 19/124* (2014.11); *H04N 19/18* (2014.11); *H04N 19/61* (2014.11)

(58) Field of Classification Search
CPC .... H04N 19/503; H04N 19/124; H04N 19/18; H04N 19/61
(Continued)

(56) References Cited

U.S. PATENT DOCUMENTS 10,264,283 B2 * 4/2019 Lee ...................... H04N 19/513
2021/0084293 A1 3/2021 Sarwer et al.

FOREIGN PATENT DOCUMENTS

WO 2021008524 A1 1/2021

OTHER PUBLICATIONS

International Search Report (ISR) (and an English language translation thereof) dated Apr. 23, 2024, issued in International Application No. PCT/JP2024/007918.

(Continued)

*Primary Examiner* — Nguyen T Truong
(74) *Attorney, Agent, or Firm* — Holtz, Holtz & Volek PC

(57) ABSTRACT

A displacement decoding unit (205) of a mesh decoding device (200) according to the present invention includes: a bypass arithmetic decoding unit (205A) configured to generate a coefficient level value by performing bypass arithmetic decoding on a displacement bit stream; an inverse quantization unit (205B) configured to generate a first transformed coefficient by performing inverse quantization on the coefficient level value; an adder (205D) configured to generate a second transformed coefficient by adding a prediction transformed coefficient and a prediction residual; an inter prediction unit (205F) configured to generate the prediction transformed coefficient by performing inter prediction by using the second transformed coefficient of a reference frame read from the frame buffer; and a second inverse transform unit (205G) configured to generate a decoded displacement by performing second inverse transform on the second transformed coefficient.

5 Claims, 8 Drawing Sheets

(51) Int. Cl.
*H04N 19/503* (2014.01)
*H04N 19/61* (2014.01)

(58) Field of Classification Search
USPC .................................................... 375/240.03
See application file for complete search history.

(56) References Cited

OTHER PUBLICATIONS

Written Opinion dated Apr. 23, 2024, issued in International Application No. PCT/JP2024/007918.
Mammou, et al., "[V-CG] Apple's Dynamic Mesh Coding CfP Response", ISO/IEC JTC 1/SC 29/WG 7 m59281; Apr. 2022.
Mammou, et al., "Video and Subdivision based Mesh Coding", Proc. 10th European Workshop on Visual Information Processing, IEEE 2022, Retrieved from the Internet: <URL: https://ieeexplore.ieee.org/ documenU9922888>. https://doi.org/ 10.1109/EUVIP 53989 .2022.9922888, pp. 1-6.
Nishimura., et al., "Arithmetic Coding of Displacements in Dynamic Meshes with Bypass Mode for Complexity Reduction", Proc. IEEE International Conference on Visual Communications and Image Processing 2023, Retrieved from the Internet: <URL: https://ieeexplore.ieee.org/documenU 10402693>. https://doi.org/10.1109/VCIP59821.2023.10402693, pp. 1-5.
Sorkine, et al., "High-Pass Quantization for Mesh Encoding", Eurographics Symposium on Geometry Processing 2003, Retrieved from the Internet: <URL: https://diglib.eg.org/ handle/10.2312/SGP.SGP 03.042-051>. http://dx.doi.org/10.2312/SGP/SGP 03/042-051, pp. 42-51.

* cited by examiner

FIG. 5

| displacement_parameter_set( ) { | Descriptor |
| --- | --- |
| transform_enabled_flag | u(1) |
| ... | |
| } | |

FIG. 6

| displacement_frame_header( ) { | Descriptor |
|---|---|
| frame_type | u(1) |
| ... | |
| } | |

FIG. 7

| displacement_data_unit( ) { | Descriptor |
|---|---|
| for(i=0; i<3; i++) { | |
| for(j=0; j<vertexCount; j++) { | |
| sig_coeff_flag[ i ][ j ] | u(v) |
| if( sig_coeff_flag[ i ][ j ] ) { | |
| coeff_abs_level_greater1_flag[ i ][ j ] | u(v) |
| if( coeff_abs_level_greater1_flag[ i ][ j ] ) { | |
| coeff_sign_flag[ i ][ j ] | u(v) |
| coeff_abs_level_remaining[ i ][ j ] | ue(v) |
| } | |
| } | |
| } | |
| } | |
| ... | |
| } | |

MESH DECODING DEVICE, MESH DECODING METHOD, AND PROGRAM

CROSS-REFERENCE TO RELATED APPLICATIONS

The present application is a continuation of PCT Application No. PCT/JP2024/007918, filed on Mar. 3, 2024, which claims the benefit of Japanese patent application No. 2023-066595 filed on Apr. 14, 2023; the entire contents of each application being incorporated herein by reference in its entirety.

TECHNICAL FIELD

The present invention relates to a mesh decoding device, a mesh decoding method, and a program.

BACKGROUND ART

Reference 1 (Khaled Mammou, Jungsun Kim, Alexis Tourapis, Dimitri Podborski, Krasimir Kolarov, "[V-CG] Apple's Dynamic Mesh Coding CfP Response," ISO/IEC JTC 1/SC 29/WG 7 m5928, April 2022) discloses a technique of decoding a mesh by dividing the mesh into a rough base mesh and a detailed displacement, transforming the displacement to a two-dimensional video, and then performing decoding by a video codec.

SUMMARY OF THE INVENTION

However, in the technology disclosed in Reference 1, a generated two-dimensional video is not suitable for encoding by a video codec, and there is a problem that encoding efficiency is lowered. Therefore, the present invention has been made in view of the above-described problems, and an object thereof is to provide a mesh decoding device, a mesh decoding method, and a program capable of improving encoding efficiency.

A first feature of the present invention is summarized as a mesh decoding device including: a displacement decoding unit configured to decode a displacement bit stream to generate and output a displacement, wherein the displacement decoding unit includes: a bypass arithmetic decoding unit configured to generate a coefficient level value by performing bypass arithmetic decoding on the displacement bit stream; an inverse quantization unit configured to generate a first transformed coefficient by performing inverse quantization on the coefficient level value; an adder configured to generate a second transformed coefficient by adding a prediction transformed coefficient and a prediction residual; a frame buffer configured to acquire and accumulate the second transformed coefficient output from the adder; an inter prediction unit configured to generate the prediction transformed coefficient by performing inter prediction by using the second transformed coefficient of a reference frame read from the frame buffer; and a second inverse transform unit configured to generate a decoded displacement by performing second inverse transform on the second transformed coefficient.

A second feature of the present invention is summarized as a mesh decoding method including a step of:

decoding a displacement bit stream to generate and output a displacement, wherein the step includes steps of: (A) generating a coefficient level value by performing bypass arithmetic decoding on the displacement bit stream; (B) generating a first transformed coefficient by performing inverse quantization on the coefficient level value; (C) generating a second transformed coefficient by adding a prediction transformed coefficient and a prediction residual; (D) acquiring the second transformed coefficient generated in the step (C) and accumulating the second transformed coefficient in a frame buffer; (E) generating the prediction transformed coefficient by performing inter prediction by using the second transformed coefficient of a reference frame read from the frame buffer; and (F) generating a decoded displacement by performing second inverse transform on the second transformed coefficient.

A third feature of the present invention is summarized as a program for causing a computer to function as a mesh decoding device, wherein the mesh decoding device includes a displacement decoding unit configured to decode a displacement bit stream to generate and output a displacement, and the displacement decoding unit includes: a bypass arithmetic decoding unit configured to generate a coefficient level value by performing bypass arithmetic decoding on the displacement bit stream; an inverse quantization unit configured to generate a first transformed coefficient by performing inverse quantization on the coefficient level value; an adder configured to generate a second transformed coefficient by adding a prediction transformed coefficient and a prediction residual; a frame buffer configured to acquire and accumulate the second transformed coefficient output from the adder; an inter prediction unit configured to generate the prediction transformed coefficient by performing inter prediction by using the second transformed coefficient of a reference frame read from the frame buffer; and a second inverse transform unit configured to generate a decoded displacement by performing second inverse transform on the second transformed coefficient.

According to the present invention, it is possible to provide a mesh decoding device, a mesh decoding method, and a program capable of improving encoding efficiency.

BRIEF DESCRIPTION OF THE DRAWINGS

FIG. 5 is a diagram illustrating an example of a syntax configuration of a displacement parameter set (DPS).

FIG. 6 is a diagram illustrating an example of a syntax configuration of a displacement frame header (DFH).

FIG. 7 is a diagram illustrating an example of a syntax configuration of a displacement data unit (DDU).

DESCRIPTION OF EMBODIMENTS

Hereinafter, embodiments of the present invention will be described with reference to the drawings. Note that components in the following embodiments can be replaced with existing components or the like as appropriate, and various variations including combinations with other existing components are possible. Therefore, the following description of the embodiments does not limit the contents of the invention described in the claims.

<First Embodiment>

Hereinafter, a mesh processing system according to the present embodiment will be described with reference to FIGS. 1 to 7.

Figure 1:
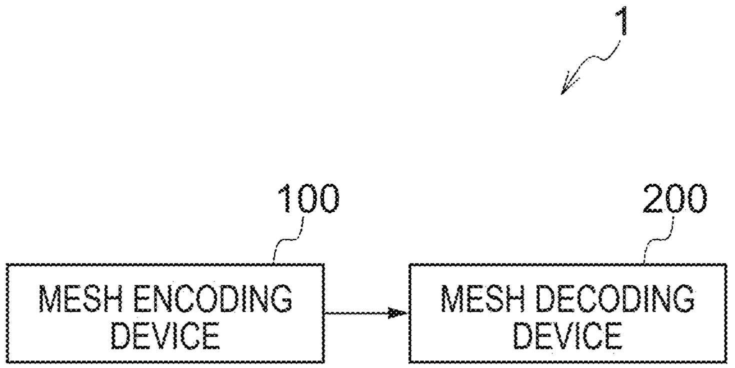
FIG. 1 is a diagram illustrating an example of a configuration of a mesh processing system 1 according to an embodiment.

FIG. 1 is a diagram illustrating an example of a configuration of the mesh processing system 1 according to the present embodiment. As illustrated in FIG. 1, the mesh processing system 1 includes a mesh encoding device 100 and a mesh decoding device 200.

Figure 2:
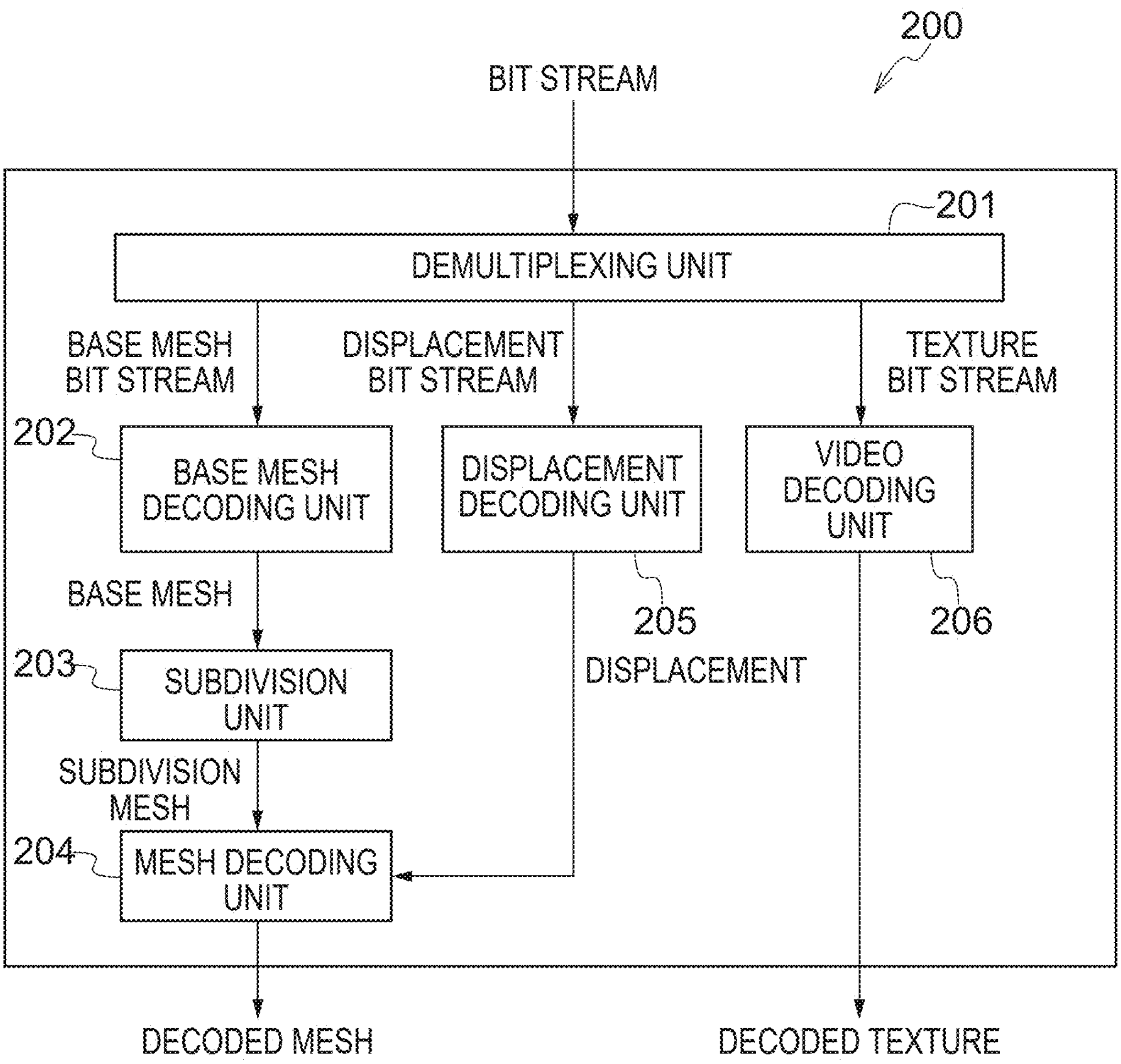
FIG. 2 is a diagram illustrating an example of functional blocks of a mesh decoding device 200 according to an embodiment.

FIG. 2 is a diagram illustrating an example of functional blocks of the mesh decoding device 200 according to the present embodiment.

As illustrated in FIG. 2, the mesh decoding device 200 includes a demultiplexing unit 201, a base mesh decoding unit 202, a subdivision unit 203, a mesh decoding unit 204, a displacement decoding unit 205, and a video decoding unit 206.

A demultiplexing unit 201 is configured to separate the multiplexed bit stream into a base mesh bit stream, a displacement bit stream, and a texture bit stream.

A base mesh decoding unit 202 is configured to decode a base mesh bit stream, and generate and output a base mesh.

A subdivision unit 203 is configured to generate and output the added subdivision vertices and their connectivity information from the base mesh decoded by the base mesh decoding unit 202 by a subdivision method indicated by the control information.

Here, the base mesh, the added subdivision vertex, and the connectivity information thereof are collectively referred to as a "subdivision mesh".

The mesh decoding unit 204 is configured to generate and output a decoded mesh by using the subdivision mesh generated by the subdivision unit 203 and the displacement decoded by the displacement decoding unit 205.

The displacement decoding unit 205 is configured to decode a displacement bit stream to generate and output a displacement.

The video decoding unit 206 is configured to decode and output texture by video coding. For example, the video decoding unit 206 may use HEVC described in Reference 1.

(Displacement Decoding Unit 205)

Figure 3:
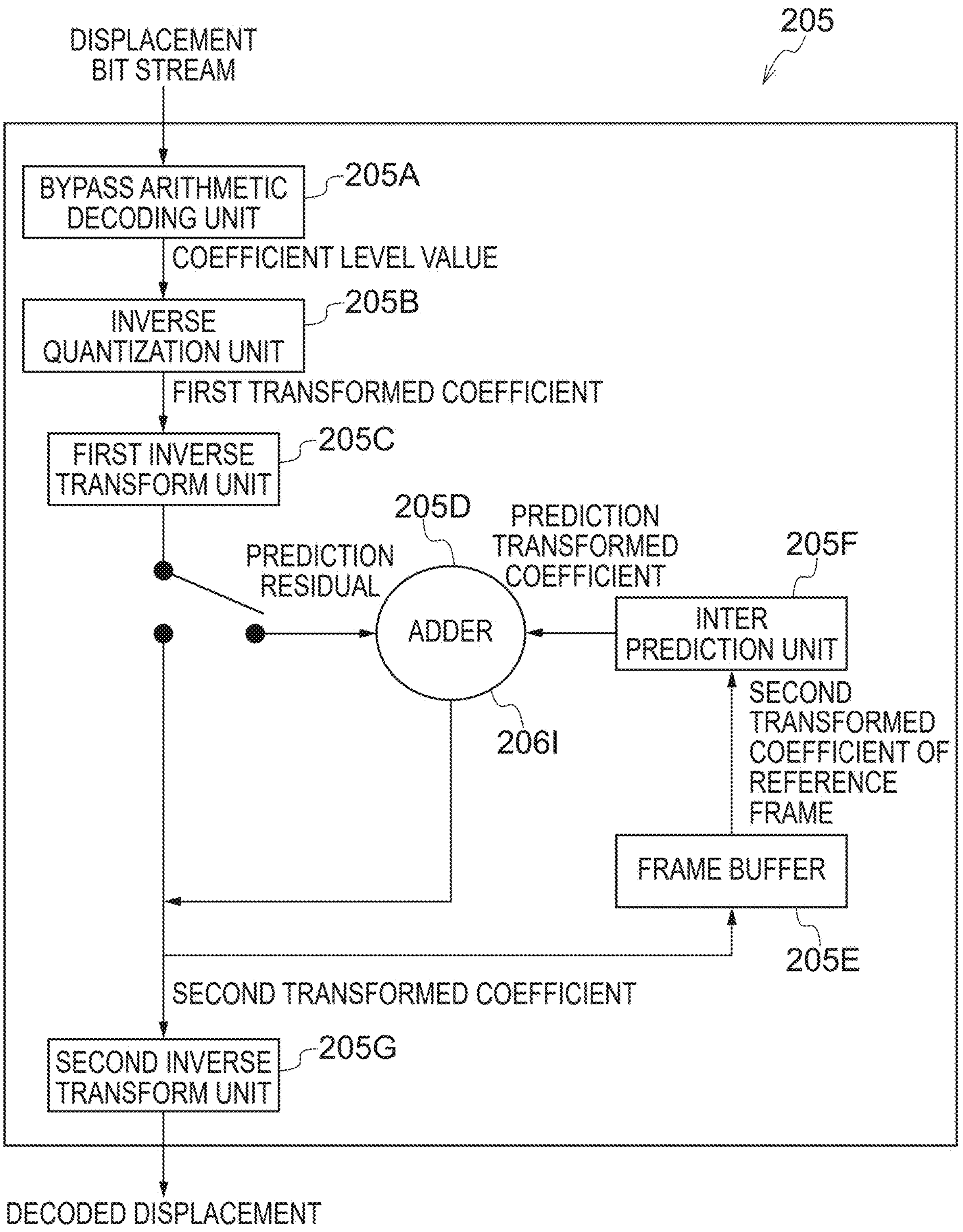
FIG. 3 is a diagram illustrating an example of functional blocks of a displacement decoding unit 205 of the mesh decoding device 200 according to an embodiment.

As illustrated in FIG. 3, the displacement decoding unit 205 includes a bypass arithmetic decoding unit 205A, an inverse quantization unit 205B, a first inverse transform unit 205C, an adder 205D, a frame buffer 205E, an inter prediction unit 205F, and a second inverse transform unit 205G.

The bypass arithmetic decoding unit 205A is configured to generate and output a coefficient level value by performing the bypass arithmetic decoding on the received displacement bit stream.

The bypass arithmetic decoding unit 205A may efficiently generate the coefficient level value by using syntax as illustrated in FIG. 7 to be described later.

The coefficient level value generated by the bypass arithmetic decoding unit 205A may be represented by a 3×N size matrix in each frame. Here, 3 indicates the number of dimensions and N indicates a total number of the subdivision vertices. A subdivision level is defined for each subdivision vertex.

The bypass arithmetic decoding unit 205A decodes an original value in accordance with which section on a number line an input binary decimal number is included.

The bypass arithmetic decoding unit 205A defines a number straight line from 0 to 1, and divides the section by a binary occurrence probability (hereinafter referred to as a context value) to use.

Here, the bypass arithmetic decoding unit 205A may bypass an update of the context value by constantly fixing the context value to 0.5. Bypassing the update of the context value enables high-speed decoding.

The bypass arithmetic decoding unit 205A may set whether to bypass an update of the context value for every syntax.

The bypass arithmetic decoding unit 205A may update the context value every time 1 bit is decoded.

The bypass arithmetic decoding unit 205A may use an update table in which the context value is slightly updated when a symbol having a high occurrence probability of 0 or 1 is generated, and the context value is largely updated when a symbol having a low occurrence probability is generated.

The bypass arithmetic decoding unit 205A may perform arithmetic decoding by using a plurality of types of context values.

For example, the context value may be defined by being divided for every dimension, may be defined by being divided for every subdivision level, or may be defined by being divided for every syntax.

As described above, the bypass arithmetic decoding unit 205A may generate the coefficient level value on the basis of the binary arithmetic decoding, or may generate the coefficient level value on the basis of multi-valued arithmetic decoding such as RangeCoder.

The inverse quantization unit 205B is configured to generate and output a first transformed coefficient by performing inverse quantization on the received coefficient level value.

The first inverse transform unit 205C is configured to generate and output a prediction residual by performing first inverse transform on the received first transformed coefficient.

For example, the first inverse transform unit 205C may perform the first inverse transform by using inverse DCT or may perform the first inverse transform by using inverse wavelet transform.

As described above, by performing inverse transform after inverse quantization, at the time of encoding, transform can be performed before quantization, and improvement in encoding efficiency can be expected.

The adder 205D is configured to acquire a prediction transformed coefficient from the inter prediction unit 205F, acquire the prediction residual from the first inverse transform unit, and add both to generate and output a second transformed coefficient.

The generated second transformed coefficient is output to the second inverse transform unit 205G and the frame buffer 205E.

The frame buffer 205E is configured to acquire and accumulate the second transformed coefficient from the adder 205D. The frame buffer 205E is configured to acquire the prediction residual from the first inverse transform unit 205C and accumulate the prediction residual as the second transformed coefficient.

The frame buffer 205E is configured to output the second transformed coefficient at the corresponding vertex in the reference frame according to control information (not illustrated).

The inter prediction unit 205F is configured to generate and output a prediction transformed coefficient by performing inter prediction using the second transformed coefficient of the reference frame read from the frame buffer 205E.

For example, the inter prediction unit 205F may directly refer to the second transformed coefficient of a corresponding frequency in the reference frame to determine the prediction transformed coefficient of each frequency in a frame to be decoded.

As described above, by performing inter prediction after inverse quantization, at the time of encoding, the inter prediction can be performed before quantization, and improvement in the encoding efficiency can be expected.

The second inverse transform unit 205G is configured to generate and output a decoded displacement by performing second inverse transform on the received second transformed coefficient (or prediction residual).

For example, the second inverse transform unit 205G may perform the second inverse transform by using inverse DCT or may perform the second inverse transform by using inverse wavelet transform.

(Configuration of Displacement Bit Stream)

Hereinafter, an example of a configuration of the displacement bit stream will be described with reference to FIGS. 4 to 7.

Note that the Descriptor column in FIGS. 5 to 7 indicates how each syntax is encoded. In FIGS. 5 to 7, u(v) means an unsigned variable-length code, ue(v) means an unsigned variable-length 0th-order exponential Golomb code, and u(n) means an n-bit code.

Figure 4:
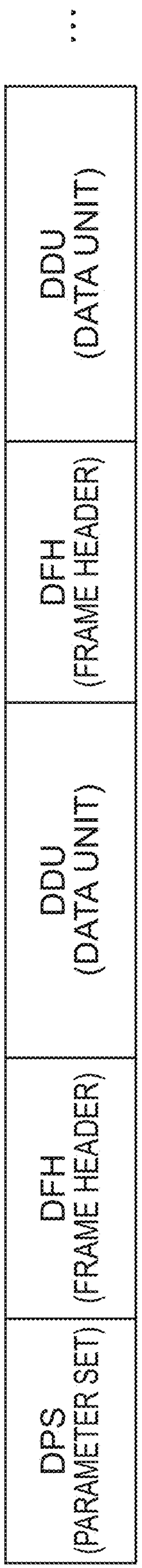
FIG. 4 is a diagram illustrating an example of a configuration of a displacement bit stream.

FIG. 4 is a diagram illustrating an example of the configuration of the displacement bit stream.

As illustrated in FIG. 4, first, the displacement bit stream may include a displacement parameter set (DPS) that is a set of control information related to decoding of the displacement.

Second, the displacement bit stream may include a displacement frame header (DFH) that is a set of control information corresponding to the frame.

Third, the displacement bit stream may include a displacement data unit (DDU), which is an encoded displacement corresponding to the frame, next to the DFH. FIG. 5 is a diagram illustrating an example of a syntax configuration of the DPS.

The DPS may include a flag (transform_enabled_flag) that controls whether to perform transform. For example, when transform_enabled_flag is 1, it may be defined that transform is performed, and when transform_enabled_flag is 0, it may be defined that transform is not performed. FIG. 6 is a diagram illustrating an example of a syntax configuration of the DFH.

The DFH may include a frame type (frame_type). For example, when frame_type is 1, it may be defined that inter prediction is performed in the corresponding frame, and when frame_type is 0, it may be defined that inter prediction is not performed in the corresponding frame.

FIG. 7 is a diagram illustrating an example of a syntax configuration of the DDU.

The DDU may include a flag indicating whether the coefficient level value is significant (sig_coeff_flag), a flag indicating whether an absolute value of the coefficient level value is greater than or equal to 2 (coeff_abs_level_greater1_flag), a flag indicating a positive or negative sign of the coefficient level value (coeff_sign_flag), and the absolute value of the coefficient level value (coeff_abs_level_remaining).

(Operation of Displacement Decoding Unit 205)

An example of an operation of the displacement decoding unit 205 will be described below with reference to FIG. 8.

Figure 8:
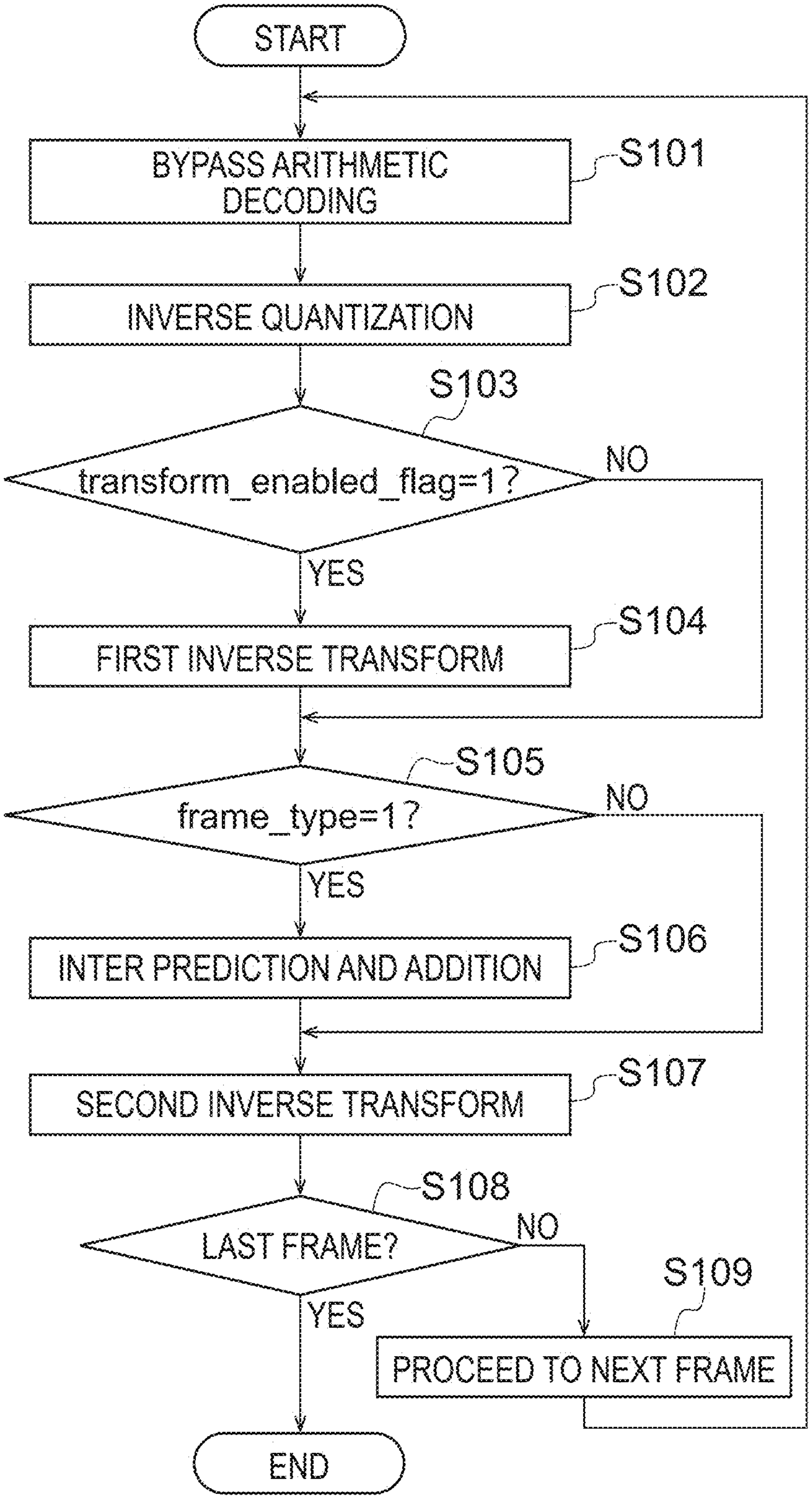
FIG. 8 is a diagram illustrating an example of an operation of a displacement decoding unit 205 of the mesh decoding device 200 according to an embodiment.

FIG. 8 is a diagram illustrating an example of the operation of the displacement decoding unit 205. In step S101, the bypass arithmetic decoding unit 205A generates the coefficient level value by performing the bypass arithmetic decoding.

In step S102, the inverse quantization unit 205B generates the first transformed coefficient by performing inverse quantization.

In step S103, the first inverse transform unit 205C determines whether transform_enabled_flag is 1. In the case of Yes, the operation proceeds to step S104, and in the case of No, the operation proceeds to step S105.

In step S104, the first inverse transform unit 205C generates a prediction residual by performing the first inverse transform.

In step S105, the inter prediction unit 205F determines whether frame_type is 1. In the case of Yes, the operation proceeds to step S106, and in the case of No, the operation proceeds to step S107.

In step S106, the inter prediction unit 205F and the adder 205D generate the prediction transformed coefficient by performing inter prediction, and then generate the second transformed coefficient by adding the prediction transformed coefficient to the prediction residual.

In step S107, the second inverse transform unit 205G generates the decoded displacement by performing the second inverse transform.

In step S108, the bypass arithmetic decoding unit 205A determines whether the currently processed frame is the last frame. In the case of Yes, the operation ends, and in the case of No, the operation proceeds to step S109.

In step S109, the bypass arithmetic decoding unit 205A proceeds to the processing of the next frame.

In the mesh decoding device 200 according to the present embodiment, by performing the inverse quantization immediately after the bypass arithmetic decoding and then performing the inverse transform and the inter prediction, the inverse transform and the inter prediction can be performed before the quantization at the time of encoding, and the encoding efficiency can be improved.

The mesh encoding device 100 and the mesh decoding device 200 described above may be implemented as programs that cause a computer to execute each function (each step).

Note that, according to the present embodiment, for example, comprehensive improvement in service quality can be realized in moving image communication, and thus, it is possible to contribute to goal 9 "Establish a resilient infrastructure, promote sustainable industrialization, and expand innovation" of the sustainable development goals (SDGs) led by the United Nations.

What is claimed is:

1. A mesh decoding device comprising:

a circuit that decodes a displacement bit stream to generate and output a displacement and a frame buffer, wherein the circuit:

generates a coefficient level value by performing bypass arithmetic decoding on the displacement bit stream;

generates a first transformed coefficient by performing inverse quantization on the coefficient level value; and generates a second transformed coefficient by adding a prediction transformed coefficient and a prediction residual;

the frame buffer acquires and accumulates the second transformed coefficient, and the circuit:

generates the prediction transformed coefficient by performing inter prediction by using the second transformed coefficient of a reference frame read from the frame buffer; and generates a decoded displacement by performing second inverse transform on the second transformed coefficient.

2. The mesh decoding device according to claim 1, wherein the circuit generates the prediction residual by performing a first inverse transform on the first transformed coefficient immediately after the inverse quantization.

3. The mesh decoding device according to claim 1, wherein the circuit sets whether or not to bypass an update of a context value for every syntax.

4. A mesh decoding method comprising:

decoding a displacement bit stream to generate and output a displacement, wherein the decoding includes:

(A) generating a coefficient level value by performing bypass arithmetic decoding on the displacement bit stream;

(B) generating a first transformed coefficient by performing inverse quantization on the coefficient level value;

(C) generating a second transformed coefficient by adding a prediction transformed coefficient and a prediction residual;

(D) acquiring the generated second transformed coefficient and accumulating the second transformed coefficient in a frame buffer;

(E) generating the prediction transformed coefficient by performing inter prediction by using the second transformed coefficient of a reference frame read from the frame buffer; and (F) generating a decoded displacement by performing second inverse transform on the second transformed coefficient.

5. A program stored on a non-transitory computer-readable medium for causing a computer to function as a mesh decoding device, wherein the mesh decoding device includes a circuit decodes a displacement bit stream to generate and output a displacement and a frame buffer, and the circuit:

generates a coefficient level value by performing bypass arithmetic decoding on the displacement bit stream;

generates a first transformed coefficient by performing inverse quantization on the coefficient level value; and generates a second transformed coefficient by adding a prediction transformed coefficient and a prediction residual, the frame buffer acquires and accumulates the second transformed coefficient, and;

the circuit:

generates the prediction transformed coefficient by performing inter prediction by using the second transformed coefficient of a reference frame read from the frame buffer; and generates a decoded displacement by performing second inverse transform on the second transformed coefficient.

* * * * *